United States Patent
Kozyreff et al.

(10) Patent No.: US 8,095,276 B2
(45) Date of Patent: Jan. 10, 2012

(54) SENSOR SYSTEM INCLUDING A CONFIRMATION SENSOR FOR DETECTING AN IMPENDING COLLISION

(75) Inventors: Michel Kozyreff, Bonsecours (FR); Bernard Guy De Mersseman, Rochester Hills, MI (US)

(73) Assignee: Autoliv ASP, Inc., Ogden, UT (US)

(*) Notice: Subject to any disclaimer, the term of this patent is extended or adjusted under 35 U.S.C. 154(b) by 558 days.

(21) Appl. No.: 12/251,612

(22) Filed: Oct. 15, 2008

(65) Prior Publication Data
US 2010/0094508 A1 Apr. 15, 2010

(51) Int. Cl.
*B60R 21/01* (2006.01)
(52) U.S. Cl. .............. 701/45; 180/280; 280/735
(58) Field of Classification Search .......... 701/45; 280/734, 735; 180/274, 282
See application file for complete search history.

(56) References Cited

U.S. PATENT DOCUMENTS

| | | |
|---|---|---|
| 5,479,173 A | 12/1995 | Yoshioka et al. |
| 6,097,332 A | 8/2000 | Crosby, II |
| 6,408,247 B1 | 6/2002 | Ichikawa et al. |
| 6,414,712 B1 | 7/2002 | Wanielik et al. |
| 6,492,935 B1 | 12/2002 | Higuchi |
| 6,519,519 B1 | 2/2003 | Stopczynski |
| 6,728,617 B2 | 4/2004 | Rao et al. |
| 6,749,218 B2 | 6/2004 | Breed |
| 6,831,591 B2 | 12/2004 | Horibe |
| 2001/0031068 A1 | 10/2001 | Ohta et al. |
| 2003/0004644 A1 | 1/2003 | Farmer |
| 2003/0060980 A1 | 3/2003 | Prakah-Asante et al. |
| 2003/0076981 A1 | 4/2003 | Smith et al. |
| 2003/0093200 A1 | 5/2003 | Gutta et al. |
| 2003/0135317 A1 | 7/2003 | Hijikata et al. |
| 2003/0149530 A1 | 8/2003 | Stopczynski |
| 2003/0160866 A1 | 8/2003 | Hori et al. |
| 2003/0179084 A1 | 9/2003 | Skrbina et al. |
| 2004/0066285 A1 | 4/2004 | Sekiguchi |
| 2004/0083042 A1 | 4/2004 | Stumoto et al. |
| 2004/0107033 A1 | 6/2004 | Rao et al. |
| 2004/0167740 A1 | 8/2004 | Skrbina et al. |
| 2005/0073396 A1 | 4/2005 | Mills et al. |

(Continued)

FOREIGN PATENT DOCUMENTS
DE 199 61 799 A1 7/2001
(Continued)

OTHER PUBLICATIONS

"Using Bayesian Programming for Multi-Sensor Multi-Target Tracking in Automotive Application", C. Coue, Th. Fraichard, P. Bessiere, E. Mazer, Proceedings of the 2003 IEEE, Sep. 14-19, 2003, pp. 2104-2109.

*Primary Examiner* — Eric Culbreth
(74) *Attorney, Agent, or Firm* — Sally J. Brown; Brinks Hofer Gilson & Lione (57) ABSTRACT

In at least one embodiment of the present invention, a sensor system for detecting an impending collision of a vehicle is provided. The sensor system comprises a primary radar arrangement providing the assessment of the severity of an impending impact and the time left before the impact. A separate confirmation detection arrangement including a confirmation sensor is for detecting within a proximity space adjacent to the vehicle to provide a confirmation output. In communication with the primary radar and confirmation detection arrangements is an electronic control module. The module is configured to produce a deployment signal for a safety device which is dependent upon evaluation of the primary radar and confirmation detection outputs.

22 Claims, 8 Drawing Sheets

| U.S. PATENT DOCUMENTS | | |
|---|---|---|
| 2005/0087381 A1 | 4/2005 | Tobata |
| 2005/0156779 A1 | 7/2005 | Wixforth |
| 2006/0091654 A1 | 5/2006 | De Mersseman et al. |
| 2006/0274149 A1 | 12/2006 | Yoshizawa |
| 2007/0050114 A1 | 3/2007 | Koike et al. |

| FOREIGN PATENT DOCUMENTS | | |
|---|---|---|
| EP | 1 338 477 A2 | 8/2003 |
| EP | 1 462 823 A1 | 9/2004 |
| WO | WO2006/052699 A1 | 5/2006 |
| WO | WO2006/052700 A1 | 5/2006 |

SENSOR SYSTEM INCLUDING A CONFIRMATION SENSOR FOR DETECTING AN IMPENDING COLLISION

FIELD OF INVENTION

This invention relates to a sensor system for a motor vehicle impact protection system.

BACKGROUND OF THE INVENTION

Enhancements in automotive safety systems over the past several decades have provided dramatic improvements in vehicle occupant protection. Presently available motor vehicles include an array of such systems, including inflatable restraint systems for the protection of occupants from frontal impacts, side impacts, and roll-over conditions. Advancements in belt restraints and vehicle interior energy absorbing systems have also contributed to enhancements in safety. Many of these systems must be deployed or actuated in a non-reversible manner upon the detection of a vehicle impact or rollover event to provide their beneficial effect. Many designs for such sensors are presently used to detect the presence of an impact or roll-over condition as it occurs.

Attention has been directed recently to providing pre-crash triggered deployable systems. For example, when an impact with an object is imminent, pre-crash triggered airbags can be deployed to reduce the severity of the impact to the occupant of the vehicle. This is because through deployment of the airbag system prior to impact, the inflated airbag can be better positioned and adequately inflated to provide enhancements in the mechanical interaction between the occupant and the vehicle to provide greater energy absorption, thus reducing the severity of injuries to the vehicle occupant during the ride-down and crush after the impact.

For the pre-crash triggered protection system to operate properly, a robust and reliable sensing system is necessary. Unlike crash sensors which trigger a deployment of a safety system while the vehicle is crushing and decelerating, the sensing system for a pre-crash triggered protection system must anticipate an impact before contact has occurred. This critical "Time Before Collision" is related to the time to deploy the actuator or pyrotechnic device (e.g. 0-200 ms) and the clearance distance between the object and the vehicle (e.g. 100-800 mm). These parameters are particularly critical in side impact conditions. Inadvertent deployment of pyrotechnic safety devices is not only costly but may temporarily disable the vehicle. Moreover, since the deployment of many systems is achieved through a release of energy, deployment at an inappropriate time may result in undesirable effects.

Radar detection systems have been studied and employed for motor vehicles for many years. Radar systems for motor vehicles operate much like their aviation counterparts in that a radio frequency signal, typically in the microwave region, is emitted from an antenna on the vehicle and the reflected-back signal is analyzed to reveal information about the reflecting target. Such systems have been considered for use in collision mitigation by braking systems for motor vehicles, as well as obstacle detection systems for driver convenience functions. Radar sensing systems also have applicability in deploying external airbags. Radar sensors provide a number of valuable inputs, including the ability to detect the range of the closest object with a high degree of accuracy (e.g. 5 cm). They can also provide an output enabling measurement of a closing velocity to a target with high accuracy. The radar cross section of a target and the characteristics of the return signal may also be used as a means of characterizing the target.

Although information obtained from radar systems yield valuable data, exclusive reliance upon a single radar sensor signal for deploying a pyrotechnic device, such as for example an airbag, has certain negative consequences. In particular, in the most simple implementation based on a single sensor signals, a single failure can lead to an inadvertent deployment signal.

BRIEF SUMMARY OF THE INVENTION

This invention is related to a sensing system for a pre-crash triggered safety system which may address the concerns discussed in the foregoing paragraphs, especially addressing the requirement of a highly reliable decision.

In at least one embodiment of the present invention, a sensor system for detecting an impending collision of a vehicle is provided. The sensor system comprises a primary radar arrangement carried by the vehicle for detecting at a first frequency (nearby the microwave frequencies 24 Ghz or 79 Ghz for example) to provide radar output based on a plurality of radar measurements. Included in the radar measurements are a radar range measurement, a radar closing velocity, an angle bearing of an object with respect to the vehicle and an estimation of the reflectivity of the object or radar cross section. A confirmation detection arrangement includes a microwave motion target detector that is positioned on the vehicle. The confirmation sensor is for detecting at a second frequency (in the microwave frequency range of 2.4 Ghz, 5.8 Ghz or 24 Ghz, for example), which is lower than the first frequency, within a proximity space adjacent to the vehicle. The confirmation detection arrangement provides a motion detection output based on a plurality of proximity measurements. Included in the proximity measurements are a presence of the object within the proximity space and a proximity closing velocity of the object with respect to the vehicle. In communication with the primary radar and confirmation detection arrangements is an electronic control module. The module is configured to produce a deployment signal for a safety device which is dependent upon evaluation of the radar and confirmation detection outputs.

In one aspect, the primary radar arrangement includes a radar sensor that detects at the first frequency which is between about 20 Ghz and 80 Ghz. The motion detection sensor detects at the second frequency which is between about 900 Mhz and 26 Ghz. The radar measurements further includes a radar cross section measurement.

These and other aspects and advantages of the present invention will become apparent upon reading the following detailed description of the invention in combination with the accompanying drawings.

DETAILED DESCRIPTION OF THE INVENTION

Detailed embodiments of the present invention are disclosed herein. It is understood however, that the disclosed embodiments are merely exemplary of the invention and may be embodied in various and alternative forms. The figures are not necessarily to scale; some figures may be configured to show the details of a particular component. Therefore, specific structural and functional details disclosed herein are not to be interpreted as limiting but merely as a representative basis with the claims and for teaching one skilled in the art to practice the present invention.

Figure 1:
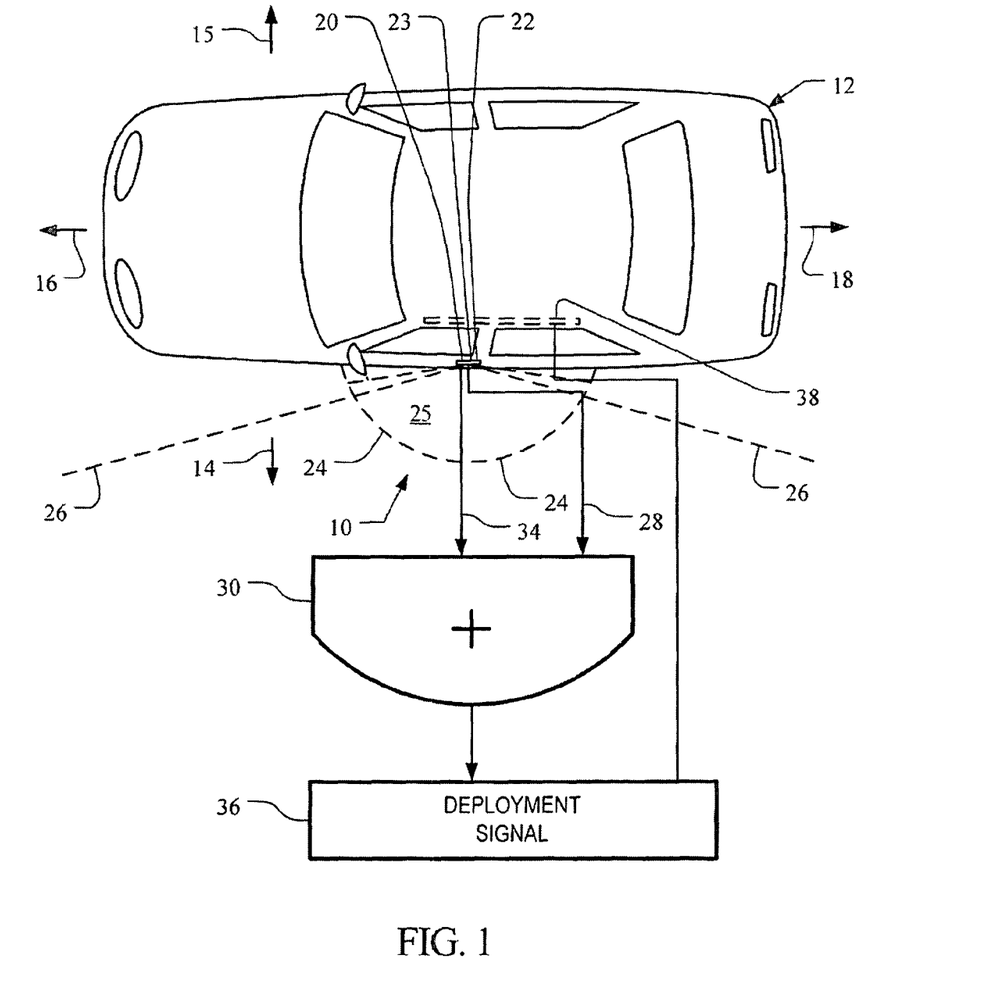
FIG. 1 is a plan view of a representative motor vehicle incorporating a crash sensor system in accordance with an embodiment of the present invention.

Now referring to FIG. 1, a sensor system 10 is shown with an associated vehicle 12. The sensor system 10 is configured for a left-hand 14 or right-hand 15 detection application relative to the vehicle 12. However, the sensor system 10 may be configured for detecting forward 16 or rearward 18 of the vehicle 12 with the same ability to sense an approaching object and prepare the vehicle 12 for the crash. In the side-hand application 14 or 15, the sensors 20 and 22, which can be contained within the same detection module 23, preferably have overlapping fields of view 24 and 26 as shown.

The sensor system 10 includes a radar sensor 22 that is configured to transmit and receive radio frequency signals, preferably in the microwave range. For example, the sensor 22 may transmit and receive signals via an antenna-transceiver arrangement operating at a frequency between about 20 Ghz and 80 Ghz, e.g., a frequency of 24 Ghz, 77 Ghz or 79 Ghz. The radar sensor 22 is further configured to provide a radar output 28 to an electronic control module (ECM) 30.

Figure 5:
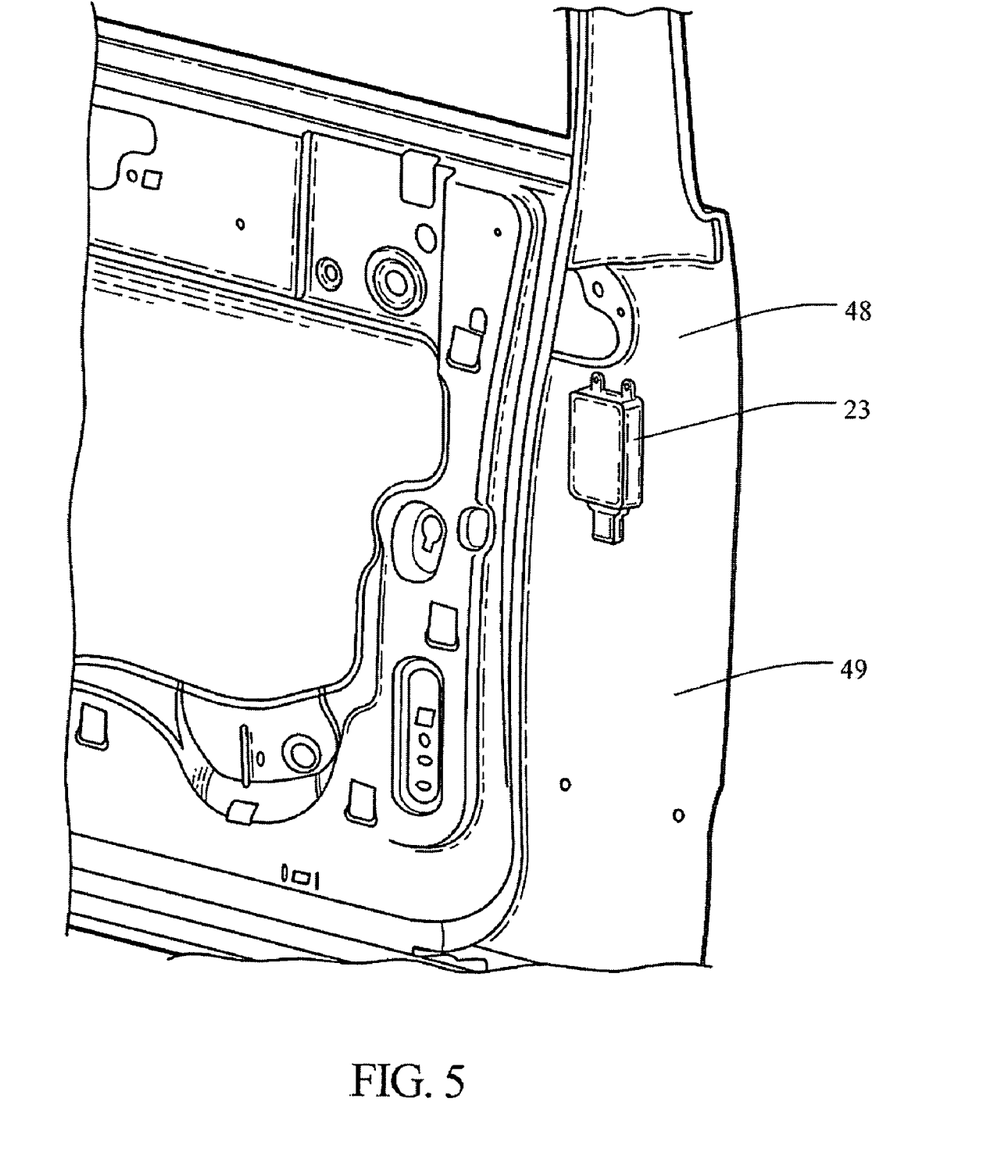
FIG. 5 is a perspective view of the crash sensor system in accordance with an embodiment of the present invention.

Referring also to FIG. 5, the detection module 23 containing the radar sensor 22 is mounted to the vehicle 12, such as for example, to an inside surface of a door panel 49 or an inside surface of an exterior panel of the door 48. The door panel 49 may be made of a dielectric material or have a dielectric window through which the radio frequency signals may be transmitted and received by the sensor 22 for detecting a potential collision with an object. Other suitable locations on the vehicle 12 for mounting the radar sensor 22 for detecting an impending collision may also be used.

Figure 3:
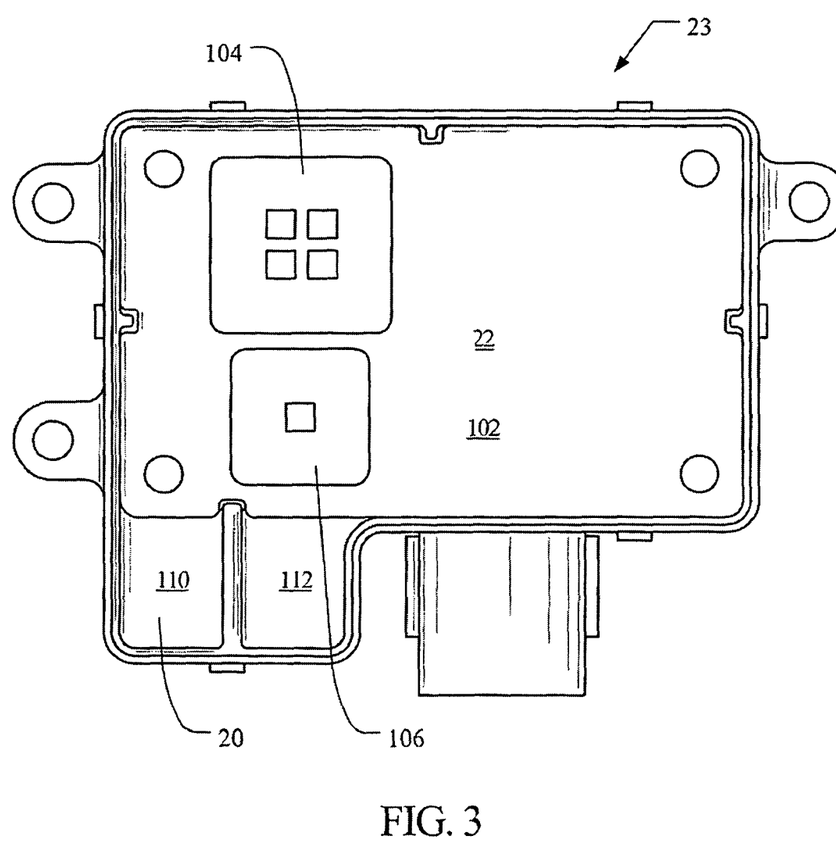
FIG. 3 is a plan view of a crash sensor system in accordance with one embodiment of the present invention.
Figure 4:
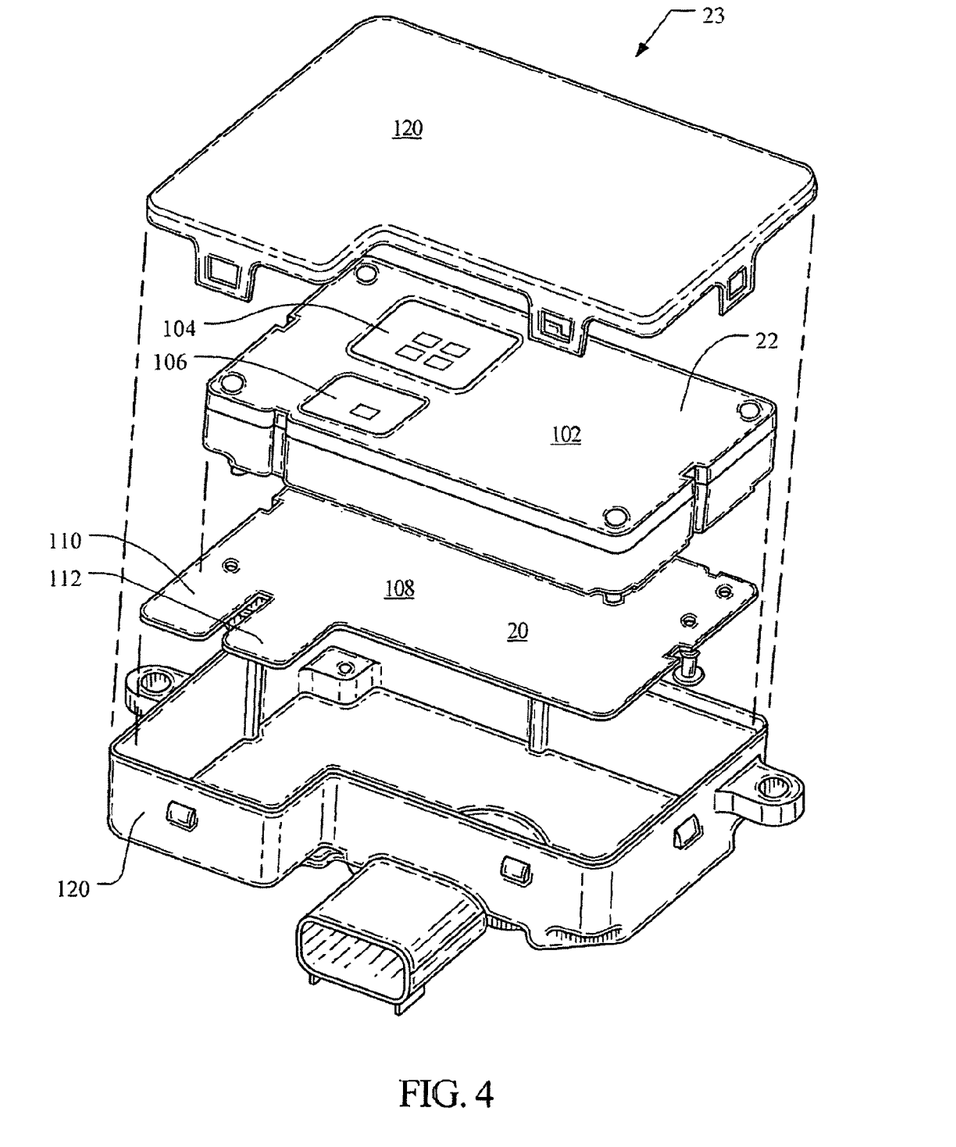
FIG. 4 is an exploded view of the crash sensor system depicted in FIG. 3.

Also with reference to FIGS. 3-4, the detection module 23 may have a radar circuit board 102 that includes multiple receivers antenna array 104 and a transmitting antenna 106 for transmitting and receiving the radar signals. In one embodiment, the radar circuit board 102 further included a microwave oscillator source (not shown), an amplifier (not shown), a mixer (not shown) and a base-band controller or processing unit 53 (see Confirmation sensor) electrically coupled together and in communication with the antennas 104 and 106 for generating, receiving and processing the radar signals. Other suitable radar sensing configurations known to those skilled in the art may also be used.

The sensor system 10 further includes a confirmation sensor 20, which may be in the form of a proximity sensor that is able to detect the presence of nearby moving objects. The sensor 20 is configured to transmit and receive proximity detection signals which may be in the microwave range or any other suitable frequency range for detecting the object within a proximity space 25 adjacent to the vehicle 12. For example, the confirmation sensor 20 may transmit and receive signals via an antenna-transceiver arrangement operating at a frequency between about 900 Mhz and 26 Ghz, e.g., a frequency of 2.4 Ghz Mhz, 5.8 Ghz and/or 5.9 Ghz provides a cost effective solution. Preferably, the confirmation sensor 20 operates at a lower frequency than the radar sensors 22. Notably, higher frequencies allow for wider bandwidth according to government regulations and smaller antenna aperture which translate into more accurate measurements with regard to range, bearing (azimuth angle) and velocity of a targeted object. Lower frequencies will exhibit approximate range and closing velocity because of antenna size and bandwidth limitations. Lower frequencies have the advantage of lower cost and are well suited for close range detection of an imminently intruding object. The confirmation sensor 20 is further configured to provide a motion target detection output or confirmation detection output 34 to the ECM 30.

In one example, the confirmation sensor 20, in combination with a microprocessor which is discussed in greater detail below, is able to reject potential interferences from external sources while detecting object proximity presence of a moving object by using signal wave modulation. The modulation may be amplitude modulation (pulsed) or frequency modulation (continuous wave or frequency shift keying). For instance, the confirmation sensor 20 may utilize on-off keying (OOK) amplitude modulation, or any other suitable modulation scheme known to those skilled in the art, such as but not limited to, amplitude-shift-keying (ASK), frequency-shift-keying (FSK) or phase-shift-keying (PSK).

Figure 2:
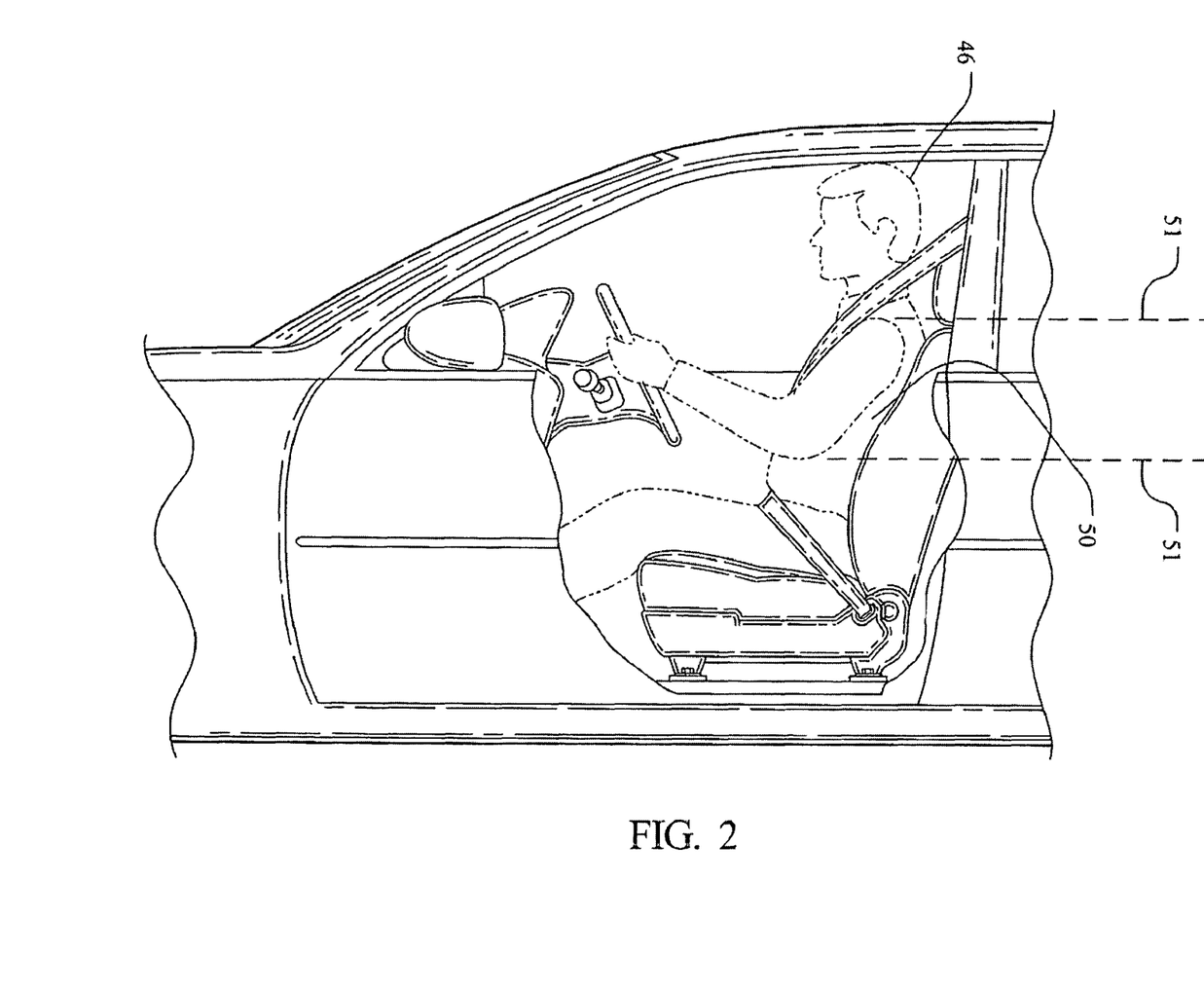
FIG. 2 is a side view of the motor vehicle depicted in FIG. 1.

In at least one embodiment, the confirmation sensor 20 is contained in the detection module 23. Preferably, the confirmation and radar sensors 20 and 22 are located relative to each other so as to share portions of each other's field of view 24 and 26. In one example, the confirmation and primary radar sensors 20 and 22 are positioned on the vehicle 12 such that the radar sensor 22 has a field of view 26 detecting outwardly relative to the vehicle 12 through the proximity space 25, as shown in FIG. 1. Referring also to FIG. 2, the detection module 23 may be located such that the proximity field of view 24 forms the proximity space 25 covering the immediate proximity near the door 48 of the vehicle 12 at a height 51 corresponding to a thorax 50 of the vehicle's occupant 46. In this scenario, enhanced protection may be provided to the occupant 46 in a side collision by positioning the confirmation sensor 20 near the targeted protection area of the occupant 46.

The confirmation sensor 20 may be provided on a proximity detection circuit board 108 and includes a transmitting antenna 110 and a receiving antenna 112. Preferably, the antennas 110 and 112 are patch or surface mounted antennas which may be more easily packaged and assembled onto the circuit board 108. Alternatively, the circuit board 108 may have just one antenna for transmitting and receiving signals. In one example, a single 2.4 Ghz or 5.8 Ghz single patch (not shown) acts as a single transmitting and receiving antenna for the confirmation sensor 20 and as a ground plane for a 24 Ghz transmitting antenna for the radar sensor 22. The single patch antenna is located behind the transmitting antenna for the radar sensor in a multi-layer PCB construction, enabling a more compact detection package requiring only a 20 mm by 30 mm detection window, such as for example, in the door of the vehicle (see FIG. 5).

Figure 7:
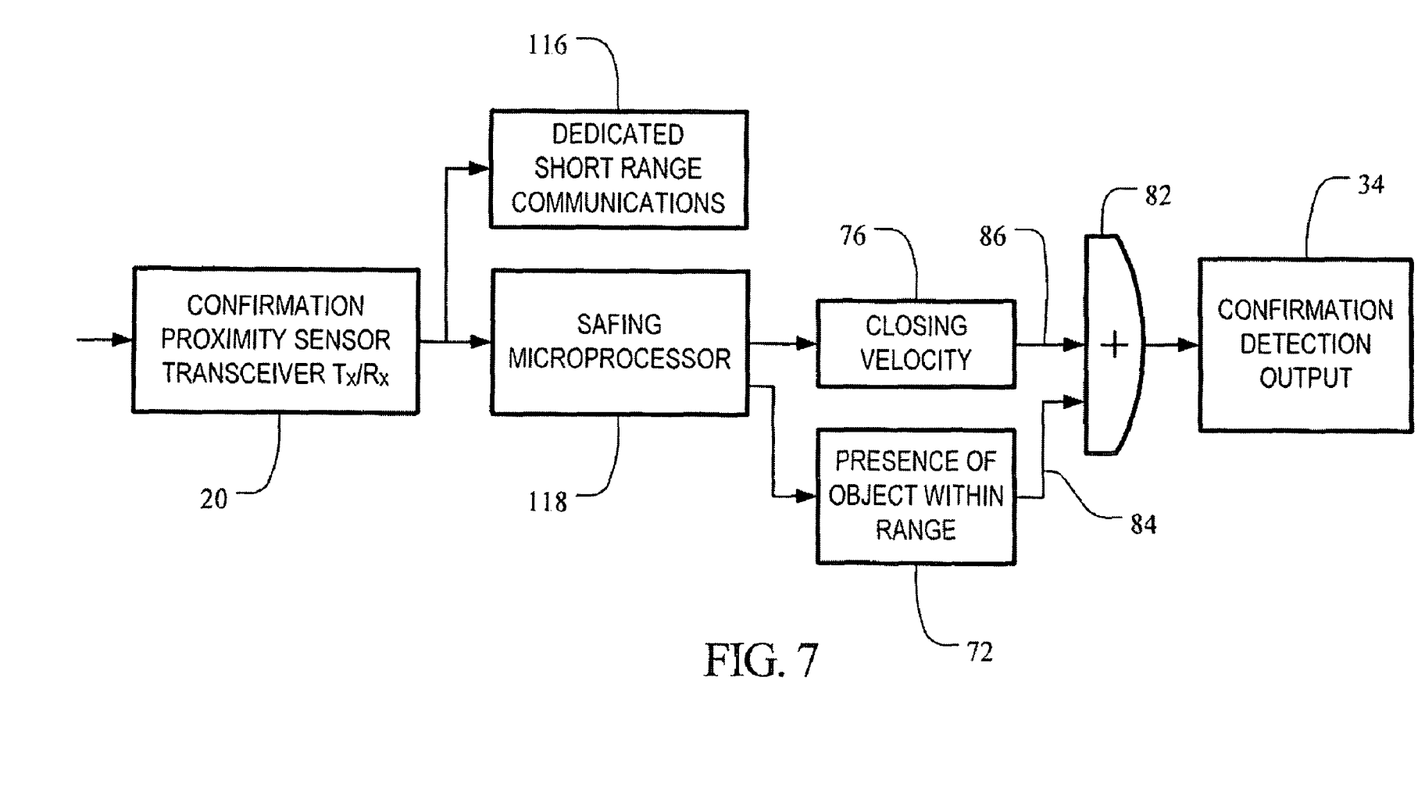
FIG. 7 is a signal and decision flow chart regarding a confirmation detection arrangement of the sensor system in accordance with an embodiment of the present invention.

The circuit board 108 may also include a transceiver (not shown), such as an integrated analog transceiver, and a dedicated microprocessor 118 or microcontroller (see FIG. 7). The transceiver is in communication with the antennas 110 and 112 for generating and receiving the proximity detection signals. The microprocessor 118 is electrically coupled with the transceiver and configured to control the transceiver for making proximity measurements within the proximity space 25. In one example, the microprocessor 118 modulates the proximity detection signals via a voltage control oscillator (not shown) or switch (not shown) in order to determine the range and velocity of the object.

The detection module 23 may also include a housing 120 for containing the circuit boards 102 and 108. The housing 120 may provide environmental protection and a means for attaching the sensors 20 and 22 to the vehicle 12.

Figure 6:
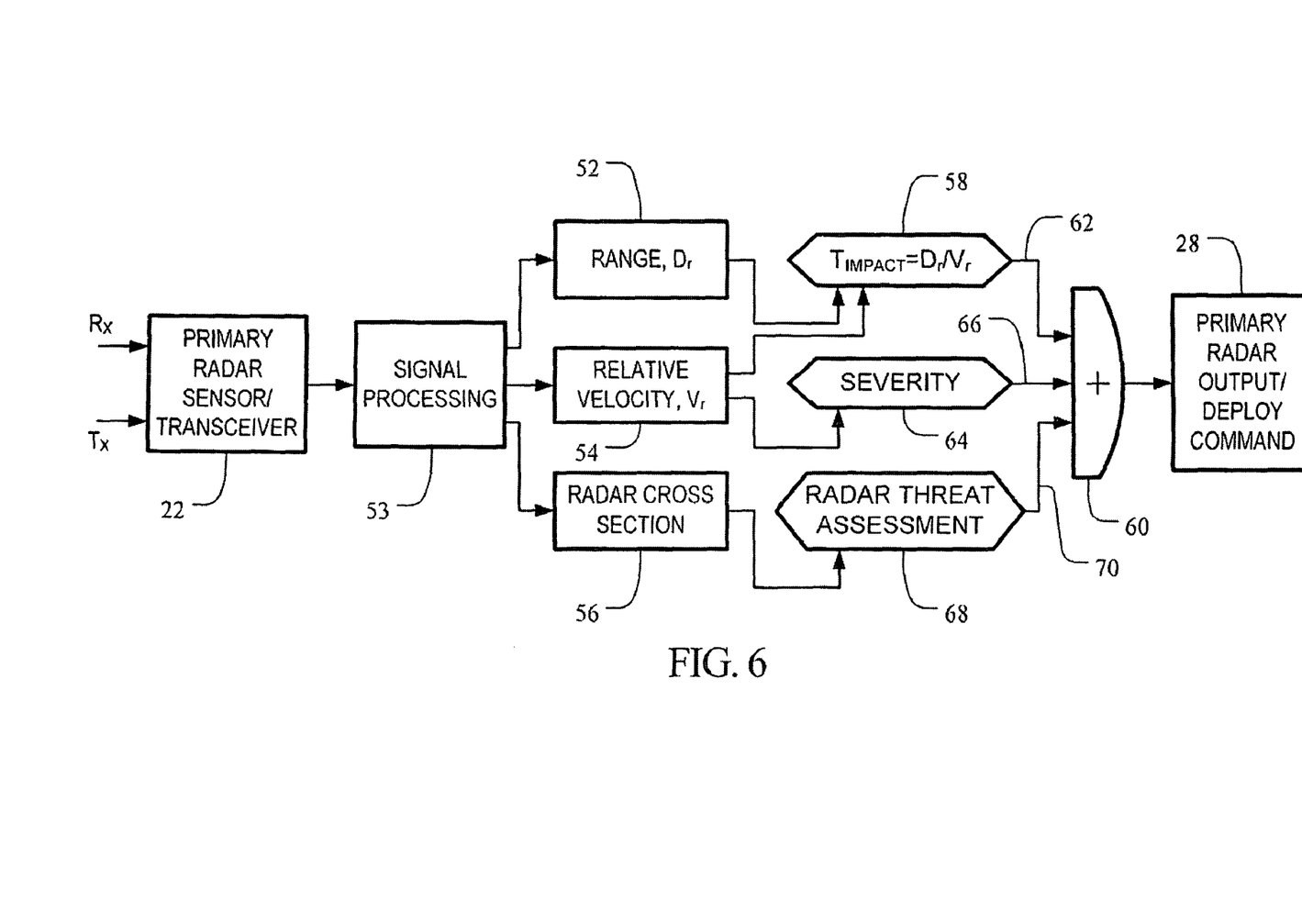
FIG. 6 is a signal and decision flow chart regarding a primary radar arrangement of the sensor system in accordance with one embodiment of the present invention.

Now with reference to FIG. 6, a diagram of the signal and decision flow related to the radar sensor 22 is provided. The radar sensor 22 analyzes a radio frequency signal reflected off an object, e.g., via a signal processor 53, to obtain a range measurement 52, a closing velocity 54, a bearing angle (horizontal azimuth angle) and a radar cross section 56.

A time of impact estimate 58 is calculated by a tracking algorithm taking as inputs the range measurement 52, the bearing angle (horizontal azimuth) measurement and the closing velocity 54. The range measurement 52 is the distance between the object and the vehicle 12. The radar sensor 22 provides distance information with high accuracy, typically within 5 cm. The closing velocity 54 is a measure of the relative speed between the object and the vehicle 12. The angular measurement, e.g., horizontal bearing and azimuth angle, is a measure by comparison of phase and/or amplitude between two receiver channels. The angular measurement is instrumental in the estimation of the trajectory of the obstacle relatively to the host vehicle. The time of impact estimate 58 is provided to block 60 along input 62. The time of impact estimate 58 is compared with the necessary time to deploy the safety device 38. The safety device 38 may be, for example, an airbag, an inflatable curtain, a pyrotechnic device in the door 48, a seatbelt pretensioner, a brake actuator or some other pyrotechnic device for protecting the occupant 46. Typically, deployment time of a side airbag is between 10 ms and 50 ms.

The closing velocity 54 is also used to determine the severity of impact as denoted by block 64. High closing velocities are associated with a more severe impact, while lower closing velocities are associated with a less severe impact. The severity of impact calculation is provided to block 60 as input 66.

The radar cross section 56 is a measure of the strength of the reflected radio frequency signal. The strength of the reflected signal is generally related to the size and shape of the object. The size and shape is used to assess the threat of the object, as denoted by block 68. The threat assessment from block 68 is provided to block 60 as input 70. Block 60 of the ECM 30 processes the time of impact 58, severity of impact 64, and threat of assessment 68 to provide the radar output 28, which is indicative of a deployment command when these inputs meet predetermined criteria for indicating an impending collision with the object.

Now with reference to FIG. 7, a signal and decision flow relating to the processing of information from the confirmation sensor 20 is provided. The confirmation sensor 20 may include and/or be in communication with a communication handler 116. The communication handler 116 is for vehicle communication applications and confirmation functions. In one example, the confirmation sensor 20 has a transceiver operating around 2.4 Ghz.

The microprocessor 118 is also in communication with the transceiver of the confirmation sensor 20, providing a confirmation detection output 34 based on a plurality of proximity measurements. Included in the proximity measurements are presence of the object within the proximity space measurement 72 and a proximity closing velocity 76 of the object with respect to the vehicle 12.

A presence of the object within the proximity space measurement 72 is indicative of an object being present and detected within the proximity space 25. The proximity space 25 may be defined by a nominal range of the sensor 20, i.e., maximum distance the confirmation sensor 20 can detect. Alternatively, the proximity space 25 may be defined by a predetermined distance that is less than the nominal range of the sensor 20. The predetermined distance may be programmed into or otherwise communicated to the microprocessor 118. The presence of the object measurement 72 is provided to block 82 as input 84. A proximity closing velocity 76 is also determined and is provided to block 82 as input 86. Block 82 of the ECM 30 processes the presence of the object measurement 72 and the proximity closing velocity 76 to provide the proximity detection output 34, which is indicative of a confirmation signal when these inputs satisfy predetermined criteria for confirming that a collision with the object will likely occur.

In one example, the confirmation sensor 20 and/or the microprocessor 118 may also use the characteristics of the reflected proximity signal as an indication of the physical size of the object. In this scenario, the physical size of the object may be used to determine whether the presence of the object measurement 72 may be disregarded and therefore, no confirmation signal is generated, such as when the size of the object is too small that a collision with the object is unlikely to damage the vehicle 12 in a substantial way.

Figure 8:
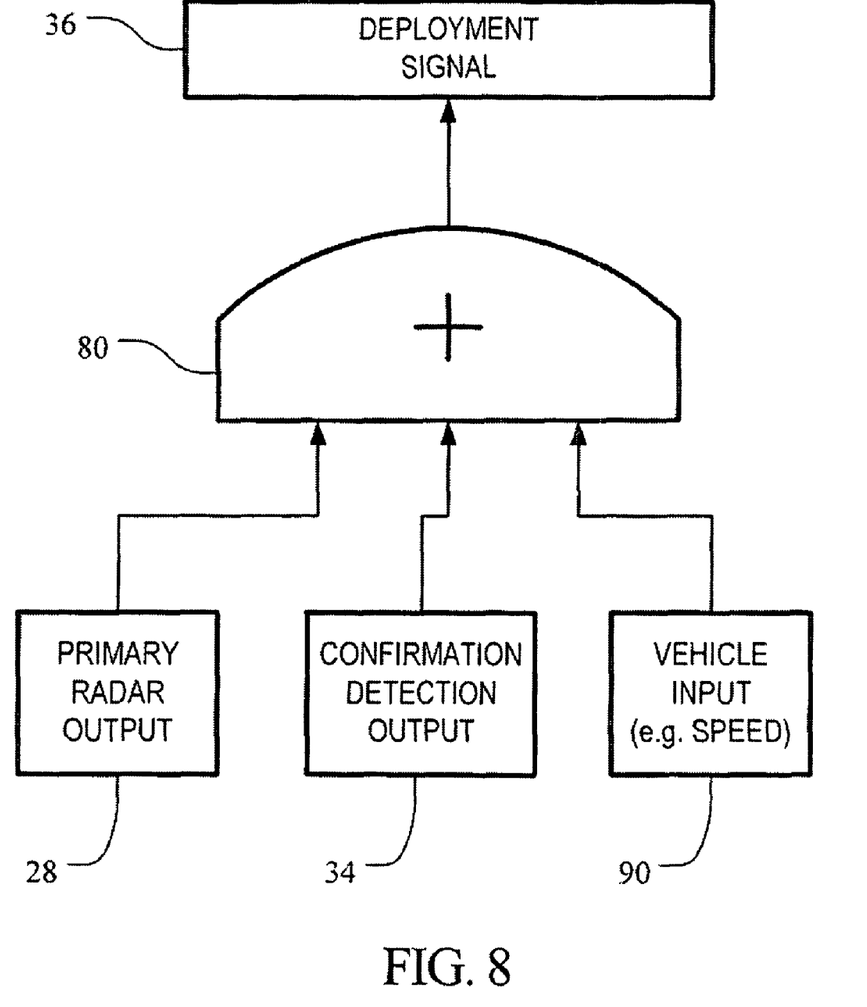
FIG. 8 is a flow chart illustrating the integration of a radar output and a confirmation detection output to control a safety device in accordance with an embodiment of the present invention.

FIG. 8 illustrates the integration of the radar output 28 and the proximity detection output 34 to provide the deployment signal 36. In one example, the radar and proximity detection outputs 28 and 34 are exclusively used to determination whether to produce the deployment signal 36. For example, the ECM 30 considers decision outputs from both sensors 20 and 22 in block 80 and applies a basic function to arrive at a deployment decision to produce the deployment signal 36. The ECM 30 may be programmed to generate the deployment signal 36 only when the radar output 28 indicates an impending collision and the confirmation detection output 34 confirms the impending collision, thereby increasing reliability of determining the impending collision.

Alternatively, the radar output 28 and the confirmation detection output 34 may be considered along with vehicle parameters 90, which may include for example, vehicle speed, yaw rate, steering angle and steering rate. The vehicle parameters 90 are evaluated in conjunction with the radar output 28 and the confirmation detection output 34 to enhance the reliability of the decision to generate the deployment signal 36.

In at least one embodiment, the deployment command corresponds to radar measurements having a radar closing velocity 54 of at least about 10 meters pre second and a time to impact 58 of less than about 50 ms. The time to impact 58 is evaluated using the radar range measurement 52 and the radar closing velocity 54. The confirmation signal corresponds to proximity measurements indicating the presence of the object within the proximity space 25 with a closing velocity 76 of the object of at least about 10 kilometers per hour. The proximity space 25 has an outer perimeter that is about 1 meter or less from the sensor 20 which is positioned on the vehicle 12. Notably, too large of a proximity space 25 may reduce reliability of determining an impending crash while too small of a proximity space 25 may reduce the time available to trigger the safety device 38 prior to impact.

In an alternative embodiment, dedicated hardware implementations, such as application specific integrated circuits, programmable logic arrays and other hardware devices, can be constructed to implement one or more of the arrangements described herein. Applications that may include the sensors and arrangements of various embodiments can broadly include a variety of electronic and computer systems. One or more embodiments described herein may implement functions using two or more specific interconnected hardware modules or devices with related control and data signals that can be communicated between and through modules, or portions of an application-specific integrated circuit. Accordingly, the present system encompasses software, firmware, and hardware implementations. The confirmation sensor has a nominal range of about 3 meter or less defining an outer perimeter of the proximity space. The deployment command corresponds to the radar measurements having the radar cross section of at least about 1 square meter, the radar closing velocity of at least about 3 meters/second and a time to impact of at less than about 50 milliseconds.

As a person skilled in the art will readily appreciate, the above description is meant as an illustration of implementation of the principles of this invention. This description is not intended to limit the scope or application of this invention in that the invention is susceptible to modification, variation, and change, without departing from the spirit of this invention, as defined in the following claims.

The invention claimed is:

1. A sensor system for detecting an impending collision of a vehicle, the sensor system comprising:
   a primary radar arrangement carried by the vehicle for detecting at a first frequency to provide radar output based on a plurality of radar measurements including a radar range measurement, an angular position and a radar closing velocity of an object with respect to the vehicle;
   a confirmation detection arrangement including a confirmation sensor positioned on the vehicle for detecting at a second frequency lower than the first frequency within a proximity space adjacent to the vehicle, the confirmation detection arrangement providing a confirmation detection output based on a plurality of proximity measurements including presence of the object within the proximity space and proximity closing velocity of the object with respect to the vehicle; and
   an electronic control module in communication with the primary radar and confirmation detection arrangements, the electronic control module configured to produce a deployment signal for a safety device which is dependent upon evaluation of the radar and confirmation detection outputs and to use the radar output as a deployment command and to use the confirmation detection output as a confirmation signal, producing the deployment signal and increasing reliability of determining an impending crash.

2. The sensor system according to claim 1 wherein the deployment command corresponds to the radar measurements having the radar closing velocity of at least about 3 meters/second and a time to impact of less than about 50 milliseconds, the time to impact being evaluated using the radar range measurement and the radar closing velocity.

3. The sensor system according to claim 2 wherein the confirmation signal corresponds to the proximity measurements indicating that the object is present within the proximity space with the proximity closing velocity of at least about 3 meters/sec.

4. The sensing system according to claim 1 wherein the confirmation sensor has a nominal range of about 3 meter or less defining an outer perimeter of the proximity space.

5. The sensor system according to claim 1 wherein the primary radar arrangement includes a radar sensor operating at a frequency of between about 20 Ghz and 80 Ghz for making the radar measurements and the confirmation sensor operates at a frequency of between about 900 Mhz and 26 Ghz for making the proximity measurements.

6. The sensor system according to claim 1 wherein the safety device is one of an airbag, an inflatable curtain, a pyrotechnic device in a vehicle door, a seatbelt pretensioner and a brake actuator.

7. The sensor system according to claim 1 wherein the radar measurements further include a radar cross section measurement of the object.

8. The sensor system according to claim 1 wherein the electronic control module generates the deployment signal based on vehicle parameters including at least one of a vehicle speed and a yaw rate value.

9. A sensor system for detecting an impending collision of a vehicle, the sensor system comprising:
   a primary radar arrangement carried by the vehicle for detecting at a first frequency to provide radar output based on a plurality of radar measurements including a radar range measurement, an angular position and a radar closing velocity of an object with respect to the vehicle;
   a confirmation detection arrangement including a confirmation sensor positioned on the vehicle for detecting at a second frequency lower than the first frequency within a proximity space adjacent to the vehicle, the confirmation detection arrangement providing a confirmation detection output based on a plurality of proximity measurements including presence of the object within the proximity space and proximity closing velocity of the object with respect to the vehicle;
   an electronic control module in communication with the primary radar and confirmation detection arrangements, the electronic control module configured to produce a deployment signal for a safety device which is dependent upon evaluation of the radar and confirmation detection outputs and to use the radar output as a deployment command and to use the confirmation detection output as a confirmation signal, producing the deployment signal and increasing reliability of determining an impending crash; and
   wherein the confirmation sensor includes a motion target detection transceiver operatively connected to at least one proximity antenna and a microprocessor configured to control the motion target detection transceiver for transmitting and receiving detection signals through the at least one proximity antenna for making the proximity measurements.

10. The sensor system according to claim 9 wherein the primary radar arrangement includes a radar sensor cooperatively positioned on the vehicle with the confirmation sensor to detect outwardly from the vehicle through the proximity space.

11. The sensor system according to claim 9 wherein the radar sensor includes a radar transceiver operatively connected to at least one radar antenna and a radar signal microprocessor configured to control the radar transceiver for transmitting and receiving radar signals through the at least one radar antenna for making the radar measurements and wherein the at least one radar antenna and the at least one proximity antenna are part of the same detection module.

12. The sensor system according to claim 11 wherein the detection module is mounted to a door of the vehicle.

13. A sensor system for detecting an impending collision of a vehicle, the sensor system comprising:
a primary radar arrangement including a radar sensor positioned on the vehicle for detecting at a first frequency between about 20 Ghz and 80 Ghz, the primary radar arrangement for providing radar output based on a plurality of radar measurements including a radar cross section, a radar range measurement, an angular position and a radar closing velocity of an object with respect to the vehicle;
a confirmation detection arrangement including a confirmation sensor positioned on the vehicle for detecting at a second frequency between about 900 Mhz and 26 Ghz within a proximity space adjacent to the vehicle, the confirmation detection arrangement providing a confirmation detection output based on a plurality of proximity measurements including presence of the object within the proximity space and proximity closing velocity of the object with respect to the vehicle; and
an electronic control module in communication with the primary radar and confirmation detection arrangements, the electronic control module configured to produce a deployment signal for a safety device which is dependent upon evaluation of the radar and confirmation detection outputs and to use the radar output as a deployment command and to use the confirmation detection output as a confirmation signal, producing the deployment signal and increasing reliability of determining an impending crash.

14. The sensor system according to claim 13 wherein the confirmation sensor has a nominal range of about 5 meter or less defining an outer perimeter of the proximity space.

15. The sensor system according to claim 13 wherein the deployment command corresponds to the radar measurements having the radar cross section of at least about 1 m$^2$, the radar closing velocity of at least about 3 meters/second and a time to impact of less than about 50 milliseconds, the time to impact being evaluated using the radar range measurement and the radar closing velocity.

16. The sensor system according to claim 13 wherein the confirmation signal corresponds to the proximity measurements indicating that the object is present within the proximity space with the proximity closing velocity of at least about 3 m/s.

17. The sensor system according to claim 13 wherein the confirmation sensor includes a motion target detection transceiver operatively connected to at least one proximity antenna and a microprocessor configured to control the motion target detection transceiver for transmitting and receiving detection signals through the at least one proximity antenna for making the proximity measurements.

18. The sensor system according to claim 17 wherein the radar sensor includes a radar transceiver operatively connected to at least one radar antenna and a radar signal microprocessor configured to control the radar transceiver for transmitting and receiving radar signals through the at least one radar antenna for making the radar measurements and wherein the at least one radar antenna and the at least one proximity antenna are part of the same detection module.

19. The sensor system according to claim 18 wherein the detection module is mounted to a door of the vehicle.

20. The sensor system according to claim 13 wherein the primary radar arrangement includes a radar sensor cooperatively positioned on the vehicle with the confirmation sensor to detect outwardly from the vehicle through the proximity space.

21. The sensor system according to claim 13 wherein the safety device is one of an airbag, an inflatable curtain, a pyrotechnic device in a vehicle door, a seatbelt pretensioner and a brake actuator.

22. The sensor system according to claim 13 wherein the electronic control module generates the deployment signal based on vehicle parameters including at least one of a vehicle speed and a yaw rate value.

* * * * *